(12) United States Patent
Toyama et al.

(10) Patent No.: US 10,319,057 B2
(45) Date of Patent: *Jun. 11, 2019

(54) SAFETY ANALYSIS SYSTEM FOR WIRING

(71) Applicant: MITSUBISHI AIRCRAFT CORPORATION, Aichi (JP)

(72) Inventors: Koji Toyama, Tokyo (JP); Satoshi Suehiro, Tokyo (JP); Yoshihiro Nakayama, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/800,795

(22) Filed: Nov. 1, 2017

(65) Prior Publication Data
US 2018/0053278 A1 Feb. 22, 2018

Related U.S. Application Data
(62) Division of application No. 14/226,925, filed on Mar. 27, 2014, now abandoned.

(30) Foreign Application Priority Data

Mar. 29, 2013 (JP) .................................. 2013-70755

(51) Int. Cl.
G06Q 50/30 (2012.01)
G06F 17/50 (2006.01)
B64F 5/60 (2017.01)

(52) U.S. Cl.
CPC ........... *G06Q 50/30* (2013.01); *G06F 17/504* (2013.01); *G06F 17/5095* (2013.01); *B64F 5/60* (2017.01); *G06F 2217/36* (2013.01); *G06F 2217/72* (2013.01)

(58) Field of Classification Search
CPC ............... G06F 17/504; G06F 17/5095; G06F 2217/72; G06F 2217/36; B64F 5/0045; B64F 5/60; G06Q 50/50; G06Q 50/30
See application file for complete search history.

(56) References Cited

U.S. PATENT DOCUMENTS

| 7,536,284 | B2 | 5/2009 | Linzey et al. |
| 2007/0050178 | A1 | 3/2007 | Linzey et al. |
| 2009/0265119 | A1 | 10/2009 | Bhattacharya et al. |

*Primary Examiner* — Sujoy K Kundu
*Assistant Examiner* — L. Anderson
(74) *Attorney, Agent, or Firm* — Pearne & Gordon LLP

(57) ABSTRACT

A safety analysis system for wiring, including: a storage unit that stores electric wire-terminal connector correlation information in which each of a plurality of electric wires and a pair of connectors are correlated with each other, terminal connector-function correlation information in which the pair of connectors located at terminals and a function of a device to which the connectors are connected are correlated with each other, and function determination information including a combination of a plurality of functions that are not allowed to be lost at the same time; and a processing unit that matches the electric wire-terminal connector correlation information and the terminal connector-function correlation information when the wire harness is identified, and generates electric wire-function correlation information in which each of the plurality of electric wires and the function of the device are correlated with each other.

10 Claims, 14 Drawing Sheets

FIG. 1
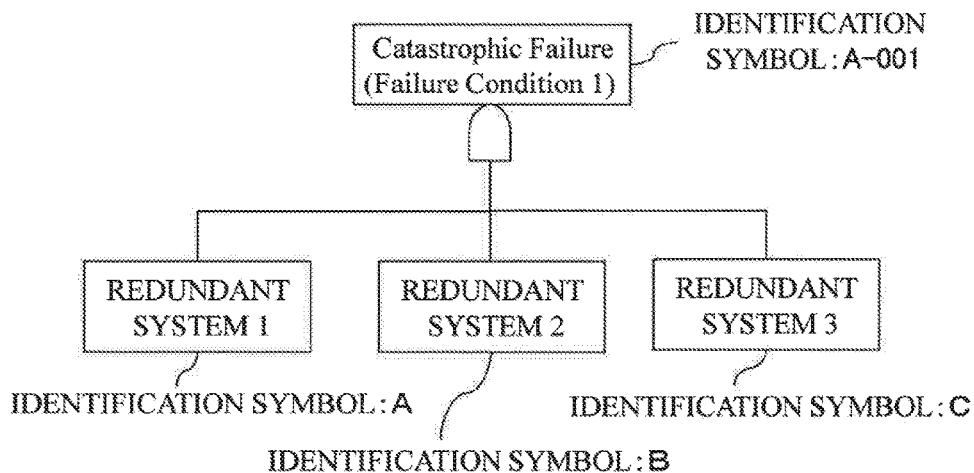
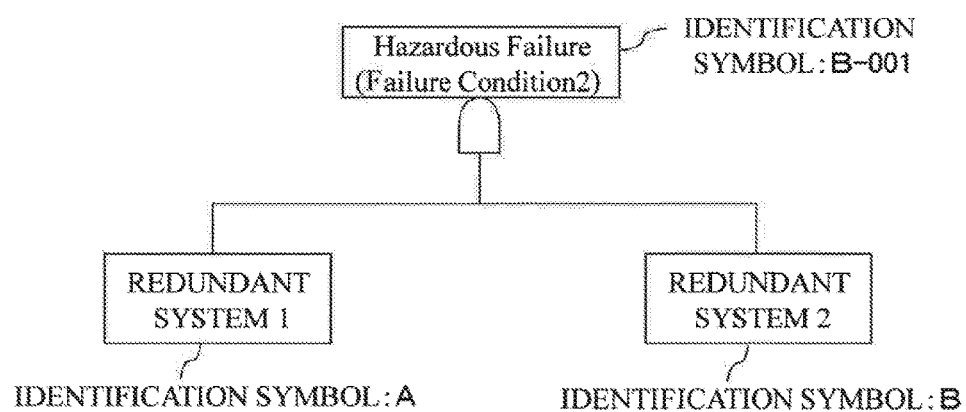

FIG. 5

HARNESS ID: 123-A

| No. | WIRE ID | CONNECTOR ID | | E-CONNECTOR ID | |
|---|---|---|---|---|---|
| | | ITEM-1 | ITEM-2 | ITEM-1 | ITEM-2 |
| 1 | 1-A-001 | P-1001 | N-1001 | O-1001 | Q-1001 |
| 2 | 1-A-002 | P-1001 | N-1001 | O-1001 | Q-1001 |
| 3 | 1-A-003 | P-1001 | N-1001 | O-1001 | Q-1001 |
| 4 | 1-A-004 | P-1001 | N-1001 | O-1001 | Q-1001 |
| 5 | 1-A-005 | P-1001 | N-1001 | O-1001 | Q-1001 |
| 6 | 1-B-001 | P-2001 | N-2001 | O-2001 | Q-2001 |
| 7 | 1-B-002 | P-2001 | N-2001 | O-2001 | Q-2001 |
| 8 | 1-B-003 | P-2001 | N-2001 | O-2001 | Q-2001 |
| 9 | 1-B-004 | P-2001 | N-2001 | O-2001 | Q-2001 |
| 10 | 1-B-005 | P-2001 | N-2001 | O-2001 | Q-2001 |
| ⋮ | | | | | |
| 91 | 1-K-001 | P-8001 | N-8001 | O-8001 | Q-8001 |
| 92 | 1-K-002 | P-8001 | N-8001 | O-8001 | Q-8001 |
| 93 | 1-K-003 | P-8001 | N-8001 | O-8001 | Q-8001 |
| 94 | 1-K-004 | P-8001 | N-8001 | O-8001 | Q-8001 |
| 95 | 1-K-005 | P-8001 | N-8001 | O-8001 | Q-8001 |
| 96 | 1-L-001 | P-9001 | N-9001 | O-9001 | Q-9001 |
| 97 | 1-L-002 | P-9001 | N-9001 | O-9001 | Q-9001 |
| 98 | 1-L-003 | P-9001 | N-9001 | O-9001 | Q-9001 |
| 99 | 1-L-004 | P-9001 | N-9001 | O-9001 | Q-9001 |
| 100 | 1-L-005 | P-9001 | N-9001 | O-9001 | Q-9001 |

FIG. 6

| E-CONNECTOR ID ||  FUNCTION ID |
| ITEM-1 | ITEM-2 | |
|---|---|---|
| O-1001 | Q-1001 | Func-A1 |
| O-1001 | Q-1001 | Func-A1 |
| O-1001 | Q-1001 | Func-A1 |
| O-1001 | Q-1001 | Func-A1 |
| O-1001 | Q-1001 | Func-A1 |
| O-2001 | Q-2001 | Func-B2 |
| O-2001 | Q-2001 | Func-B2 |
| O-2001 | Q-2001 | Func-B2 |
| O-2001 | Q-2001 | Func-B2 |
| O-2001 | Q-2001 | Func-B2 |
| ⋮ | | |
| T-8001 | Q-8001 | Func-Z1 |
| T-8001 | Q-8001 | Func-Z1 |
| T-8001 | Q-8001 | Func-Z1 |
| T-8001 | Q-8001 | Func-Z1 |
| T-8001 | Q-8001 | Func-Z1 |
| T-9001 | Q-9001 | Func-Y3 |
| T-9001 | Q-9001 | Func-Y3 |
| T-9001 | Q-9001 | Func-Y3 |
| T-9001 | Q-9001 | Func-Y3 |
| T-9001 | Q-9001 | Func-Y3 |
| ⋮ | | |

FIG. 7

| COMBINATION OF CAUSES (FUNCTIONS) RESULTING IN CATASTROPHIC FAILURE ||
|---|---|
| Func-A1 | Func-C1 |
| Func-A2 | Func-C2 |
| Func-A3 | Func-C3 |
| ⋮ ||
| Func-Y1 | Func-Z1 |
| Func-Y2 | Func-Z2 |
| Func-Y3 | Func-Z3 |

FIG. 8

HARNESS ID: 123-A

| No. | WIRE ID | CONNECTOR ID | | E-CONNECTOR ID | | FUNC-TION ID |
|---|---|---|---|---|---|---|
| | | ITEM-1 | ITEM-2 | ITEM-1 | ITEM-2 | |
| 1 | 1-A-001 | P-1001 | N-1001 | O-1001 | Q-1001 | Func-A1 |
| 2 | 1-A-002 | P-1001 | N-1001 | O-1001 | Q-1001 | Func-A1 |
| 3 | 1-A-003 | P-1001 | N-1001 | O-1001 | Q-1001 | Func-A1 |
| 4 | 1-A-004 | P-1001 | N-1001 | O-1001 | Q-1001 | Func-A1 |
| 5 | 1-A-005 | P-1001 | N-1001 | O-1001 | Q-1001 | Func-A1 |
| 6 | 1-B-001 | P-2001 | N-2001 | O-2001 | Q-2001 | Func-B2 |
| 7 | 1-B-002 | P-2001 | N-2001 | O-2001 | Q-2001 | Func-B2 |
| 8 | 1-B-003 | P-2001 | N-2001 | O-2001 | Q-2001 | Func-B2 |
| 9 | 1-B-004 | P-2001 | N-2001 | O-2001 | Q-2001 | Func-B2 |
| 10 | 1-B-005 | P-2001 | N-2001 | O-2001 | Q-2001 | Func-B2 |
| ⋮ | | | | | | |
| 91 | 1-K-001 | P-8001 | N-8001 | O-8001 | Q-8001 | Func-Z1 |
| 92 | 1-K-002 | P-8001 | N-8001 | O-8001 | Q-8001 | Func-Z1 |
| 93 | 1-K-003 | P-8001 | N-8001 | O-8001 | Q-8001 | Func-Z1 |
| 94 | 1-K-004 | P-8001 | N-8001 | O-8001 | Q-8001 | Func-Z1 |
| 95 | 1-K-005 | P-8001 | N-8001 | O-8001 | Q-8001 | Func-Z1 |
| 96 | 1-L-001 | P-9001 | N-9001 | T-9001 | Q-9001 | Func-Y3 |
| 97 | 1-L-002 | P-9001 | N-9001 | T-9001 | Q-9001 | Func-Y3 |
| 98 | 1-L-003 | P-9001 | N-9001 | T-9001 | Q-9001 | Func-Y3 |
| 99 | 1-L-004 | P-9001 | N-9001 | T-9001 | Q-9001 | Func-Y3 |
| 100 | 1-L-005 | P-9001 | N-9001 | T-9001 | Q-9001 | Func-Y3 |

} NO COMBINATION OF FUNCTIONS RESULTING IN TOP EVENT

FIG. 9

HARNESS ID: 123-A

| No. | WIRE ID | CONNECTOR ID | | E-CONNECTOR ID | | FUNC-TION ID |
|---|---|---|---|---|---|---|
| | | ITEM-1 | ITEM-2 | ITEM-1 | ITEM-2 | |
| 1 | 1-A-001 | P-1001 | N-1001 | O-1001 | Q-1001 | Func-A1 |
| 2 | 1-A-002 | P-1001 | N-1001 | O-1001 | Q-1001 | Func-A1 |
| 3 | 1-A-003 | P-1001 | N-1001 | O-1001 | Q-1001 | Func-A1 |
| 4 | 1-A-004 | P-1001 | N-1001 | O-1001 | Q-1001 | Func-A1 |
| 5 | 1-A-005 | P-1001 | N-1001 | O-1001 | Q-1001 | Func-A1 |
| 6 | 1-B-001 | P-2001 | N-2001 | O-2001 | Q-2001 | Func-B2 |
| 7 | 1-B-002 | P-2001 | N-2001 | O-2001 | Q-2001 | Func-B2 |
| 8 | 1-B-003 | P-2001 | N-2001 | O-2001 | Q-2001 | Func-B2 |
| 9 | 1-B-004 | P-2001 | N-2001 | O-2001 | Q-2001 | Func-B2 |
| 10 | 1-B-005 | P-2001 | N-2001 | O-2001 | Q-2001 | Func-B2 |
| ⋮ | | | | | | |
| 91 | 1-K-001 | P-8001 | N-8001 | M-8001 | F-8001 | Func-Z3 |
| 92 | 1-K-002 | P-8001 | N-8001 | M-8001 | F-8001 | Func-Z3 |
| 93 | 1-K-003 | P-8001 | N-8001 | M-8001 | F-8001 | Func-Z3 |
| 94 | 1-K-004 | P-8001 | N-8001 | M-8001 | F-8001 | Func-Z3 |
| 95 | 1-K-005 | P-8001 | N-8001 | M-8001 | F-8001 | Func-Z3 |
| 96 | 1-L-001 | P-9001 | N-9001 | O-9001 | N-9001 | Func-Y3 |
| 97 | 1-L-002 | P-9001 | N-9001 | O-9001 | N-9001 | Func-Y3 |
| 98 | 1-L-003 | P-9001 | N-9001 | O-9001 | N-9001 | Func-Y3 |
| 99 | 1-L-004 | P-9001 | N-9001 | O-9001 | N-9001 | Func-Y3 |
| 100 | 1-L-005 | P-9001 | N-9001 | O-9001 | N-9001 | Func-Y3 |

COMBINATION OF FUNCTIONS RESULTING IN TOP EVENT

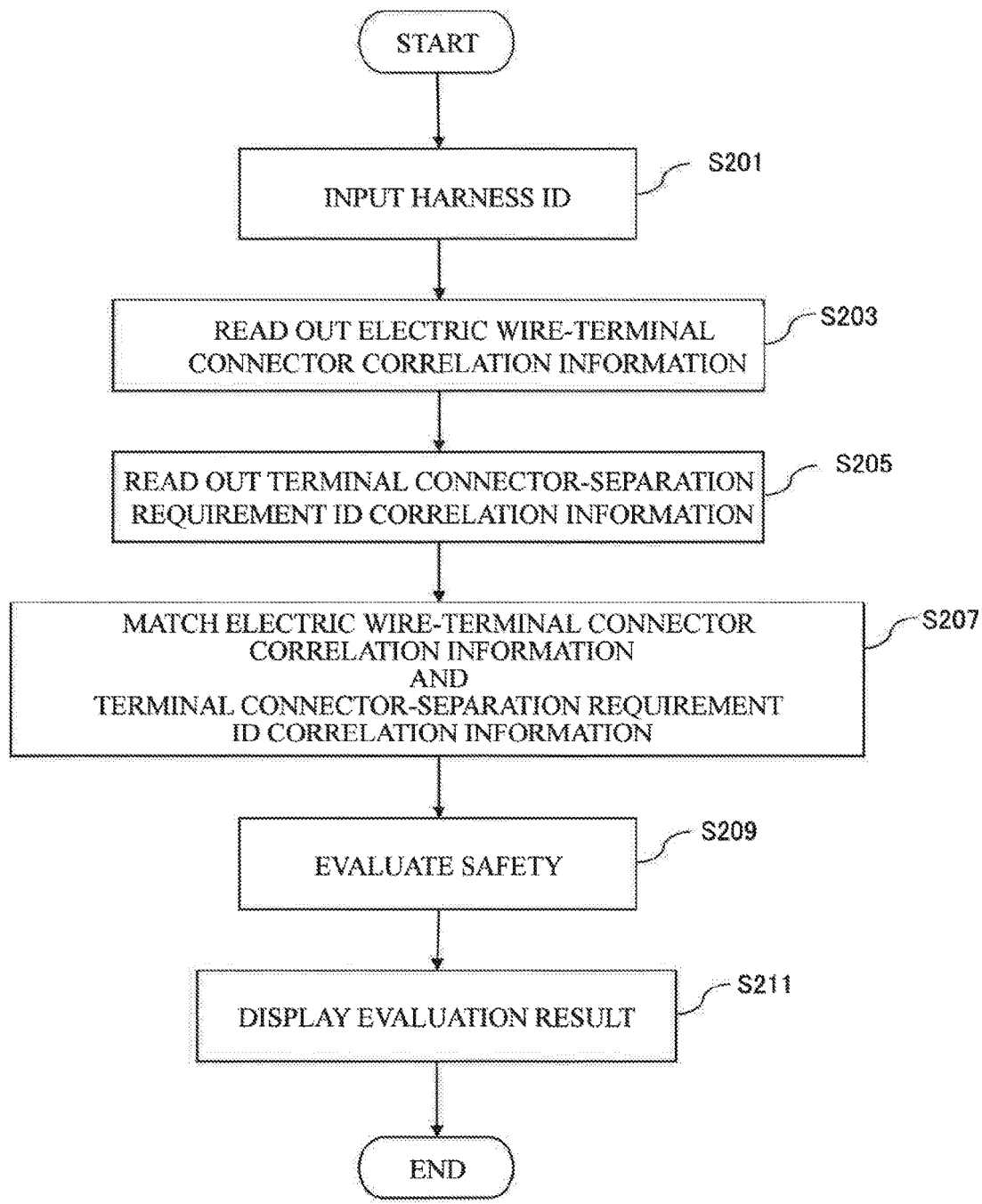

FIG. 12

| E-CONNECTOR ID | | SEPARATION REQUIREMENT ID |
|---|---|---|
| ITEM-1 | ITEM-2 | |
| O-1001 | Q-1001 | B-001A |
| O-1001 | Q-1001 | B-001A |
| O-1001 | Q-1001 | B-001A |
| O-1001 | Q-1001 | B-001B |
| O-1001 | Q-1001 | B-001B |
| O-2001 | Q-2001 | C-001A |
| O-2001 | Q-2001 | C-001A |
| O-2001 | Q-2001 | C-001B |
| O-2001 | Q-2001 | C-001B |
| O-2001 | Q-2001 | C-001B |
| ⋮ | | |
| T-8101 | S-8101 | J-001A |
| T-8101 | S-8101 | J-001A |
| T-8101 | S-8101 | J-001A |
| T-8101 | S-8101 | J-001B |
| T-8101 | S-8101 | J-001B |
| T-9001 | Q-9001 | L-001A |
| T-9001 | Q-9001 | L-001A |
| T-9001 | Q-9001 | L-001A |
| T-9001 | Q-9001 | L-001B |
| T-9001 | Q-9001 | L-001B |
| ⋮ | | |

FIG. 13

| No. | WIRE ID | CONNECTOR ID | | E-CONNECTOR ID | | SEPARA-TION REQUIRE-MENT ID |
|---|---|---|---|---|---|---|
| | | ITEM-1 | ITEM-2 | ITEM-1 | ITEM-2 | |
| 1 | 1-A-001 | P-1001 | N-1001 | O-1001 | Q-1001 | B-001A |
| 2 | 1-A-002 | P-1001 | N-1001 | O-1001 | Q-1001 | B-001A |
| 3 | 1-A-003 | P-1001 | N-1001 | O-1001 | Q-1001 | B-001A |
| 4 | 1-A-004 | P-1001 | N-1001 | O-1001 | Q-1001 | B-001A |
| 5 | 1-A-005 | P-1001 | N-1001 | O-1001 | Q-1001 | B-001A |
| 6 | 1-B-001 | P-2001 | N-2001 | O-2001 | Q-2001 | C-001A |
| 7 | 1-B-002 | P-2001 | N-2001 | O-2001 | Q-2001 | C-001A |
| 8 | 1-B-003 | P-2001 | N-2001 | O-2001 | Q-2001 | C-001A |
| 9 | 1-B-004 | P-2001 | N-2001 | O-2001 | Q-2001 | C-001A |
| 10 | 1-B-005 | P-2001 | N-2001 | O-2001 | Q-2001 | C-001A |
| ⋮ | | | | | | |
| 91 | 1-K-001 | P-8001 | N-8001 | O-8001 | Q-1001 | J-001A |
| 92 | 1-K-002 | P-8001 | N-8001 | O-8001 | Q-1001 | J-001A |
| 93 | 1-K-003 | P-8001 | N-8001 | O-8001 | Q-1001 | J-001A |
| 94 | 1-K-004 | P-8001 | N-8001 | O-8001 | Q-1001 | J-001A |
| 95 | 1-K-005 | P-8001 | N-8001 | O-8001 | Q-1001 | J-001A |
| 96 | 1-L-001 | P-9001 | N-9001 | O-9001 | Q-2001 | L-001A |
| 97 | 1-L-002 | P-9001 | N-9001 | O-9001 | Q-2001 | L-001A |
| 98 | 1-L-003 | P-9001 | N-9001 | O-9001 | Q-2001 | L-001A |
| 99 | 1-L-004 | P-9001 | N-9001 | O-9001 | Q-2001 | L-001A |
| 100 | 1-L-005 | P-9001 | N-9001 | O-9001 | Q-2001 | L-001A |

FIG. 14

| No. | WIRE ID | CONNECTOR ID | | E-CONNECTOR ID | | SEPARATION REQUIREMENT ID |
|---|---|---|---|---|---|---|
| | | ITEM-1 | ITEM-2 | ITEM-1 | ITEM-2 | |
| 1 | 1-A-001 | P-1001 | N-1001 | O-1001 | Q-1001 | B-001A |
| 2 | 1-A-002 | P-1001 | N-1001 | O-1001 | Q-1001 | B-001A |
| 3 | 1-A-003 | P-1001 | N-1001 | O-1001 | Q-1001 | B-001B |
| 4 | 1-A-004 | P-1001 | N-1001 | O-1001 | Q-1001 | B-001A |
| 5 | 1-A-005 | P-1001 | N-1001 | O-1001 | Q-1001 | B-001A |
| 6 | 1-B-001 | P-2001 | N-2001 | O-2001 | Q-2001 | C-001A |
| 7 | 1-B-002 | P-2001 | N-2001 | O-2001 | Q-2001 | C-001A |
| 8 | 1-B-003 | P-2001 | N-2001 | O-2001 | Q-2001 | C-001A |
| 9 | 1-B-004 | P-2001 | N-2001 | O-2001 | Q-2001 | C-001C |
| 10 | 1-B-005 | P-2001 | N-2001 | O-2001 | Q-2001 | C-001A |
| ... | | | | | | |
| 91 | 1-K-001 | P-8101 | N-8101 | T-8101 | S-8101 | J-001A |
| 92 | 1-K-002 | P-8101 | N-8101 | T-8101 | S-8101 | J-001A |
| 93 | 1-K-003 | P-8101 | N-8101 | T-8101 | S-8101 | J-001A |
| 94 | 1-K-004 | P-8101 | N-8101 | T-8101 | S-8101 | J-001B |
| 95 | 1-K-005 | P-8101 | N-8101 | T-8101 | S-8101 | J-001A |
| 96 | 1-L-001 | P-9001 | N-9001 | O-9001 | Q-9001 | L-001A |
| 97 | 1-L-002 | P-9001 | N-9001 | O-9001 | Q-9001 | L-001B |
| 98 | 1-L-003 | P-9001 | N-9001 | O-9001 | Q-9001 | L-001A |
| 99 | 1-L-004 | P-9001 | N-9001 | O-9001 | Q-9001 | L-001A |
| 100 | 1-L-005 | P-9001 | N-9001 | O-9001 | Q-9001 | L-001A |

SAFETY ANALYSIS SYSTEM FOR WIRING

BACKGROUND OF THE INVENTION

Field of the Invention

The present invention relates to a system for analyzing the safety of wiring in which a plurality of electronics are connected by electric wires via connectors.

Description of the Related Art

For example, as for a system in which an input device, a control device, and an output device are connected by a wire harness (simply referred to as harness below), it is necessary to check whether the harness is wired with required safety before the system is constructed and actually used. Particularly, in aircraft, the safety deeply involves human lives, and thus, it is essential to confirm the safety. However, when a large-scale system is employed, there are a large number of harnesses (a large number of wires), and a large number of terminal devices such as input devices, or relay devices (collectively referred to as terminal devices below). Thus, the safety of wiring cannot be easily confirmed. In aircraft, redundancy is imparted to electronics (terminal devices) and electric wires so as to guarantee the safety, which also makes it difficult to confirm the safety.

U.S. Pat. No. 7,536,284 proposes a method for quantitatively evaluating the safety. As for a system or a component, quantitative safety analysis using a failure rate can be generally performed. Meanwhile, as for wiring, wiring failure analysis using an arc fault is required. However, it is not easy to analytically obtain the failure rate by calculations due to the probability of an arc phenomenon. In the quantitative safety analysis, it is also not possible to confirm that redundancy is ensured.

The present invention has been accomplished in view of such problems, and an object thereof is to provide a system which can qualitatively analyze the safety of wiring even in a complicated wiring structure.

SUMMARY OF THE INVENTION

The present invention is a safety analysis system for wiring in a wiring structure in which each of a plurality of electric wires belonging to a wire harness is connected to a pair of connectors located at terminals via a relay element, the safety analysis system including a storage unit and a processing unit.

The storage unit stores electric wire-terminal connector correlation information in which each of the plurality of electric wires and the pair of connectors are correlated with each other; terminal connector-function correlation information in which the pair of connectors located at the terminals and a function of a device to which the connectors are connected are correlated with each other; and function determination information including a combination of a plurality of functions that are not allowed to be lost at the same time.

The processing unit matches the electric wire-terminal connector correlation information and the terminal connector-function correlation information when the wire harness is identified, and generates electric wire-function correlation information in which each of the plurality of electric wires and the function of the device are correlated with each other.

In the safety analysis system according to the present invention, the processing unit may determine whether or not the combination of the plurality of functions included in the function determination information exists in the generated electric wire-function correlation information, and may evaluate that the wire harness has safety when the combination does not exist. The evaluation herein is called first evaluation.

Although the evaluation may also be performed by a person referring to the generated electric wire-function correlation information, a more quick and accurate evaluation result can be obtained by the processing unit.

In the safety analysis system according to the present invention, the processing unit may command a display unit to display the generated electric wire-function correlation information and/or the evaluation result thereon.

The evaluation result can be referred to for design change.

The safety analysis system according to the present invention may also perform second evaluation in addition to the aforementioned first evaluation.

To perform the second evaluation, the storage unit stores terminal connector-separation requirement correlation information in which the pair of connectors located at terminals and a separation requirement code are correlated with each other. The processing unit matches the electric wire-terminal connector correlation information and the terminal connector-separation requirement correlation information when the wire harness is identified, and generates electric wire-separation requirement correlation information in which each of the plurality of electric wires and the separation requirement code are correlated with each other.

It is also possible to evaluate whether the harness has safety by referring to the generated electric wire-separation requirement correlation information.

In the second evaluation, the processing unit may determine whether or not the plurality of separation requirement codes included in the generated electric wire-separation requirement correlation information are identical within a range in which redundancy is required, and may evaluate that the wire harness has safety when the plurality of separation requirement codes are identical so as to obtain a quick and accurate evaluation result.

In the second evaluation, the processing unit may also command the display unit to display the evaluation result thereon.

The above description is based on a premise that the single safety analysis system performs both the first evaluation and the second evaluation. However, the present invention also allows a safety analysis system that performs the first evaluation and a safety analysis system that performs the second evaluation to exist independently of each other. Also, in the safety analysis system that can perform both the first evaluation and the second evaluation, the first evaluation and the second evaluation may be performed in any order and at any timing.

The present invention can provide the system which can qualitatively analyze the safety of wiring even in a complicated wiring structure.

BRIEF DESCRIPTION OF THE DRAWINGS

FIG. 1 is a view illustrating the number of redundancies necessary for wiring of an aircraft;

FIG. 5 is a view illustrating one example of electric wire-terminal connector correlation information used for the first evaluation and second evaluation;

FIG. 6 is a view illustrating one example of terminal connector-function correlation information used for the first evaluation;

FIG. 7 is a view illustrating one example of function determination information used for the first evaluation;

FIG. 8 is a view illustrating an example of a matching result between the electric wire-terminal connector correlation information and the terminal connector-function correlation information in the first evaluation in which safety is confirmed;

FIG. 9 is a view illustrating an example of a matching result between the electric wire-terminal connector correlation information and the terminal connector-function correlation information in the first evaluation in which safety is not confirmed;

FIG. 10A shows a case in which safety is confirmed; and FIG. 10B shows a case in which safety is not confirmed;

FIG. 11 is a flowchart illustrating a procedure in the second evaluation;

FIG. 12 is a view illustrating one example of terminal connector-separation requirement correlation information used for the second evaluation;

FIG. 13 is a view illustrating an example of a matching result between the electric wire-terminal connector correlation information and the terminal connector-separation requirement correlation information in the second evaluation in which safety is confirmed; and FIG. 14 is a view illustrating an example of a matching result between the electric wire-terminal connector correlation information and the terminal connector-separation requirement correlation information in the second evaluation in which safety is not confirmed.

DETAILED DESCRIPTION OF THE PREFERRED EMBODIMENTS

Figure 2A:
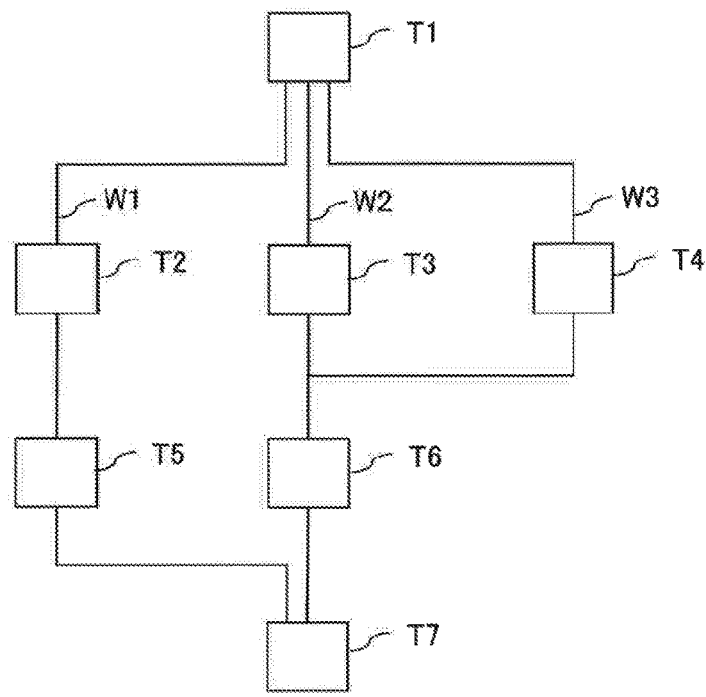
FIGS. 2A and 2B are views illustrating one example of a simplified wiring structure.

In the following, the present invention is described in detail based on an embodiment shown in the accompanying drawings.

A safety analysis system 10 for harnesses according to the present embodiment sets the number of redundancies necessary for electric wires by employing the concept of fault tolerance as a qualitative analysis requirement. For example, as shown in FIG. 1, an extremely rare probability of incidence (e.g., equivalent of $10^{-9}$), which is a tolerable level as the probability of incidence, is achieved for an electric wire which will lead to a "Catastrophic Failure" by ensuring at least three systems (three redundancies) independent of each other. Similarly, an extremely low probability of incidence (e.g., equivalent of $10^{-7}$), which is a tolerable level as the probability of incidence, is achieved for an electric wire which will lead to a "Hazardous Failure" by ensuring at least two systems (two redundancies) independent of each other. It goes without saying that the required number of systems (the required degree of redundancy) may be set as appropriate.

A condition having a lower degree of hazard than the Catastrophic Failure and the Hazardous Failure is also defined as the failure condition. Examples thereof include "Major" and "Minor." It should be noted that these definitions are merely one example.

In the present embodiment, a separation requirement ID is given to the aforementioned redundant system.

The separation requirement ID in the present embodiment is given as a combination of an identification symbol identified corresponding to each hazard event, and an identification symbol identified corresponding to each redundant system, in other words, each electric wire.

For example, an identification symbol corresponding to the Catastrophic Failure in FIG. 1 is A-001, and identification symbols respectively corresponding to a redundant system 1, a redundant system 2, and a redundant system 3 are A, B, and C. In this case, separation requirement IDs for the redundant system 1, the redundant system 2, and the redundant system 3 in the Catastrophic Failure are respectively A-00A, A-001B, and A-001C.

Similarly, an identification symbol corresponding to the Hazardous Failure in FIG. 1 is B-001, and identification symbols respectively corresponding to a redundant system 1 and a redundant system 2 are A and B. In this case, separation requirement IDs for the redundant system 1 and the redundant system 2 in the Hazardous Failure are respectively B-001A and B-001B.

The separation requirement IDs are used for evaluating the safety of an electric wire in second evaluation as described below in detail.

The redundant system in FIG. 1 needs to be reliably independent of an assumed failure cause. That is, even when three redundancies are ensured at a terminal portion where electric wires are drawn out, the branching electric wires may be included in a single harness (one bundle). In this case, if a failure (loss) occurs in the bundle, the safety may not be guaranteed.

Figure 2B:
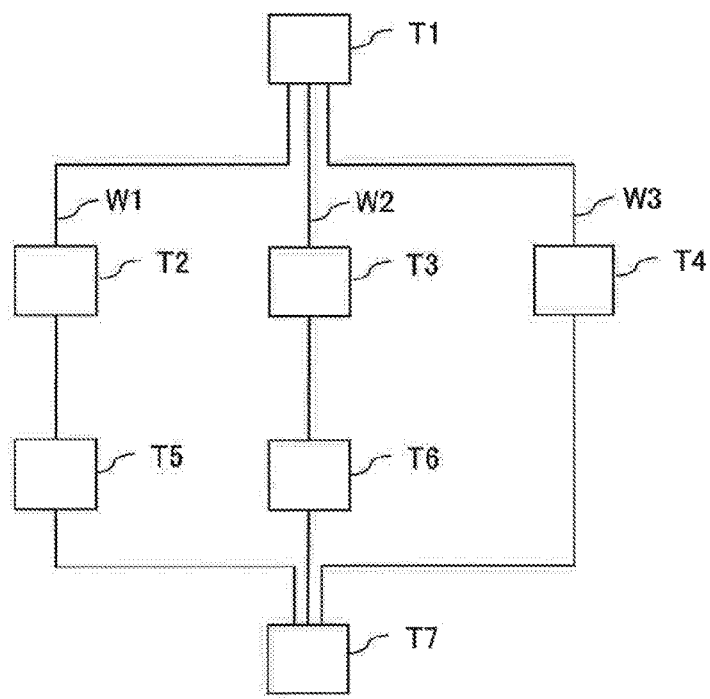

For example, as shown in FIGS. 2A and 2B, a case in which three redundancies (three systems) composed of electric wires W1, W2, and W3 are drawn out from a terminal device T1, and lead to a corresponding terminal device T7 is assumed. In an example in FIG. 2A, the electric wire W1 leads to the terminal device T7 via a relay device T2 and a relay device T5. The electric wire W2 leads to the terminal device T7 via a relay device T3 and a relay device T6. The electric wire W3 leads to the terminal device T7 via a relay device T4 and the relay device T6. In the example in FIG. 2A, the electric wire W2 and the electric wire W3 pass through the same route from between the relay devices T3 and T6, that is, belong to one bundle. Thus, the three redundancies are not maintained. Meanwhile, in an example in FIG. 2B, the electric wires W1, W2, and W3 pass through separate routes, in other words, harnesses to which the electric wires W1, W2, and W3 belong are separated from each other up to the terminal device T7. Thus, the three redundancies are maintained. In the example in FIG. 2A, if the one-bundle portion is lost, the safety is reduced. Therefore, it is necessary to perform evaluation by analyzing whether or not the designed wires are separately wired according to a requirement.

The safety analysis system 10 according to the present embodiment evaluates whether the wires are separately wired according to a requirement from two different viewpoints.

As a first viewpoint, the safety is evaluated by focusing on a function of each terminal device. The evaluation is called first evaluation.

As a second viewpoint, the safety is evaluated by focusing on a separation requirement ID given to each electric wire. The evaluation is called second evaluation.

The harness is an assembly of a connector and a bundle of electric wires (a bundle). Each electric wire is electrically connected to a pin (or a terminal) of the connector. The harness is fixed with a clamp or the like.

Although only the electric wires W1, W2, and W3 are shown for facilitating understanding in FIGS. 2A and 2B, it goes without saying that a harness (a connector and a bundle) is connected between the terminal device T1 and the terminal device T7, and a plurality of electric wires belong to the bundle in an actual wiring structure. For example, an electric wire W11 connecting the terminal device T1 and the relay device T2 is electrically connected to an electric wire W12 between the relay device T2 and the relay device T5 via the relay device T2, and further electrically connected to an electric wire W13 between the relay device T5 and the terminal device T7 via the relay device T5. In this case, the devices to which the electric wire W12 is directly connected are the relay device T2 and the relay device T5, and the devices located at terminals are the terminal device T1 and the terminal device T7. Each electric wire is connected to a connector connected to the terminal device T1 or the like, which is omitted in the above description. It goes without saying that the three redundancies (the three systems) composed of the electric wires W1, W2, and W3 are drawn out from separate connectors of the terminal device T1. The wiring structure may also be applied to any device or component. It also goes without saying that the wiring structure may be applied to, for example, a configuration in which the three redundancies (the three systems) composed of the electric wires W1, W2, and W3 are respectively connected to terminal devices T11, T12, and T13.

Figure 3:
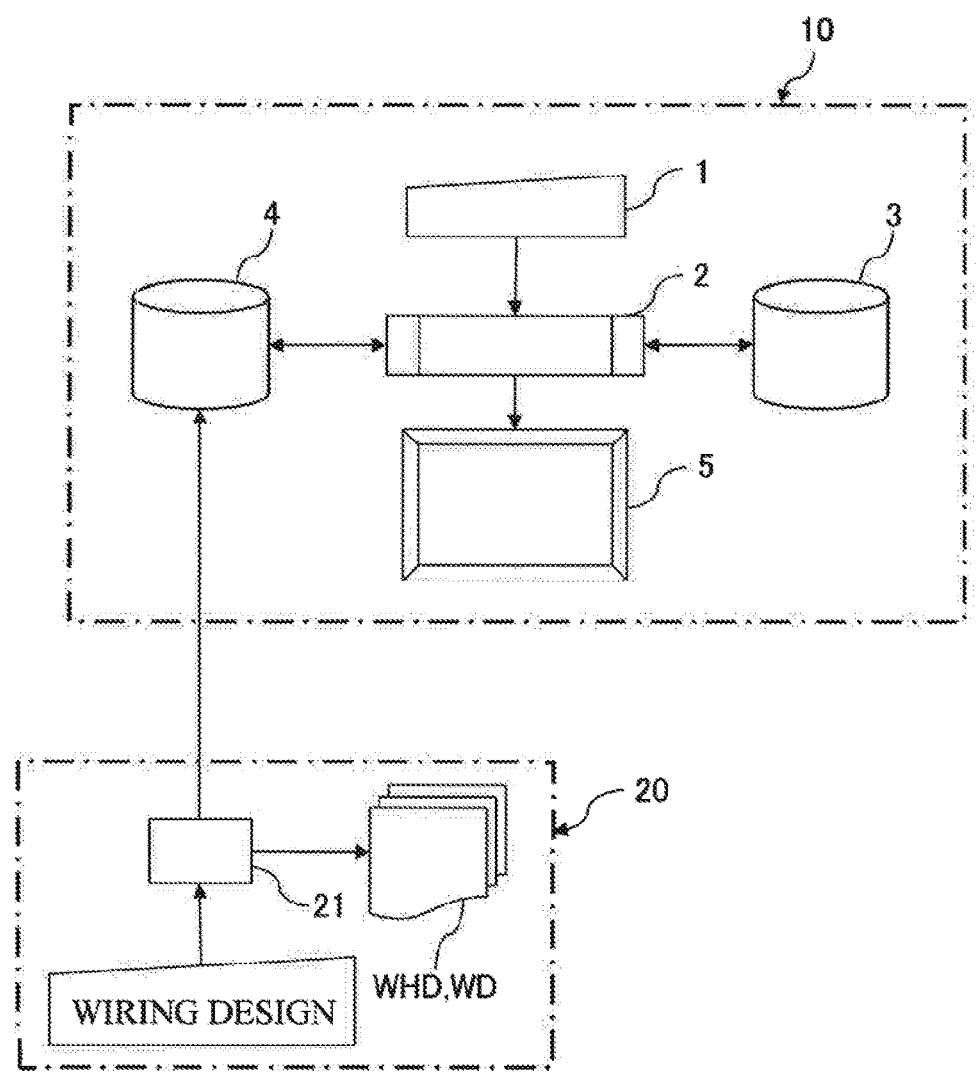
FIG. 3 is a view schematically illustrating the configuration of a safety analysis system according to a present embodiment.

As shown in FIG. 3, the safety analysis system 10 according to the present embodiment includes an input unit 1, a processing unit 2, a first database 3, a second database 4, and a display unit 5. The safety analysis system 10 may be composed of a personal computer or other computer devices.

The safety analysis system 10 is also connected to a wiring drawing system 20. The wiring drawing system 20 is also composed of a computer device.

[Outline of the Safety Analysis System 10]

The input unit 1 is a section into which an instruction required for executing the first evaluation and the second evaluation is input. For example, the input unit 1 may be composed of a keyboard as an input device of a computer.

The processing unit 2 reads out information stored in the first database 3 and the second database 4 according to an instruction from the input unit 1, performs necessary processing for executing the first evaluation and the second evaluation, and commands the display unit 5 to display evaluation results thereon.

The first database 3 stores "terminal connector-function correlation information" and "function determination information" required for executing the first evaluation. The terminal connector-function correlation information is data in table form in which connectors located at terminals and a function of a device where the connectors are provided are correlated with each other. The function determination information is data in table form in which all combinations of causes resulting in the Catastrophic Failure are described. Specific examples of the terminal connector-function correlation information and the function determination information are described below.

The first database 3 also stores "terminal connector-separation requirement correlation information" required for executing the second evaluation. The terminal connector-separation requirement correlation information is data in table form in which connectors located at terminals and a separation requirement ID are correlated with each other. The separation requirement ID is described in more detail in the second evaluation.

From the wiring drawing system 20, the second database 4 acquires and stores electric wire-terminal connector correlation information that identifies a connection state between an electric wire of a harness constituting a system as an evaluation object and connectors located at terminals. A specific example of the electric wire-terminal connector correlation information is described below.

The display unit 5 displays a result processed by the processing unit 2. The display unit 5 may be composed of a display as a display device of a computer.

[Outline of the Wiring Drawing System 20]

The wiring drawing system 20 includes a CAD (Computer Aided Design) 21. The CAD 21 acquires connection/location information regarding system constituent elements in association with a wiring design work, and creates wire harness diagrams (WHD), and wiring diagrams (WD). The WHD shows a connection relationship between a connector and a bundle (including a bundle section and a node). The WD shows a connection relationship between an electric wire and a connector included in a harness.

The CAD 21 provides the electric wire-terminal connector correlation information created from the acquired WHD and WD to the second database 4 of the safety analysis system 10. The second database 4 stores the electric wire-terminal connector correlation information provided from the CAD 21.

Next, the safety evaluation by the safety analysis system 10 is described in the order of the first evaluation and the second evaluation. The first evaluation and the second evaluation are executed independently of each other, and the order of description herein does not limit the present invention.

[First Evaluation]

In the following, the first evaluation is described by reference to FIGS. 4 to 10.

First, the outline of a processing procedure in the first evaluation is described by reference to FIG. 4.

Figure 4:
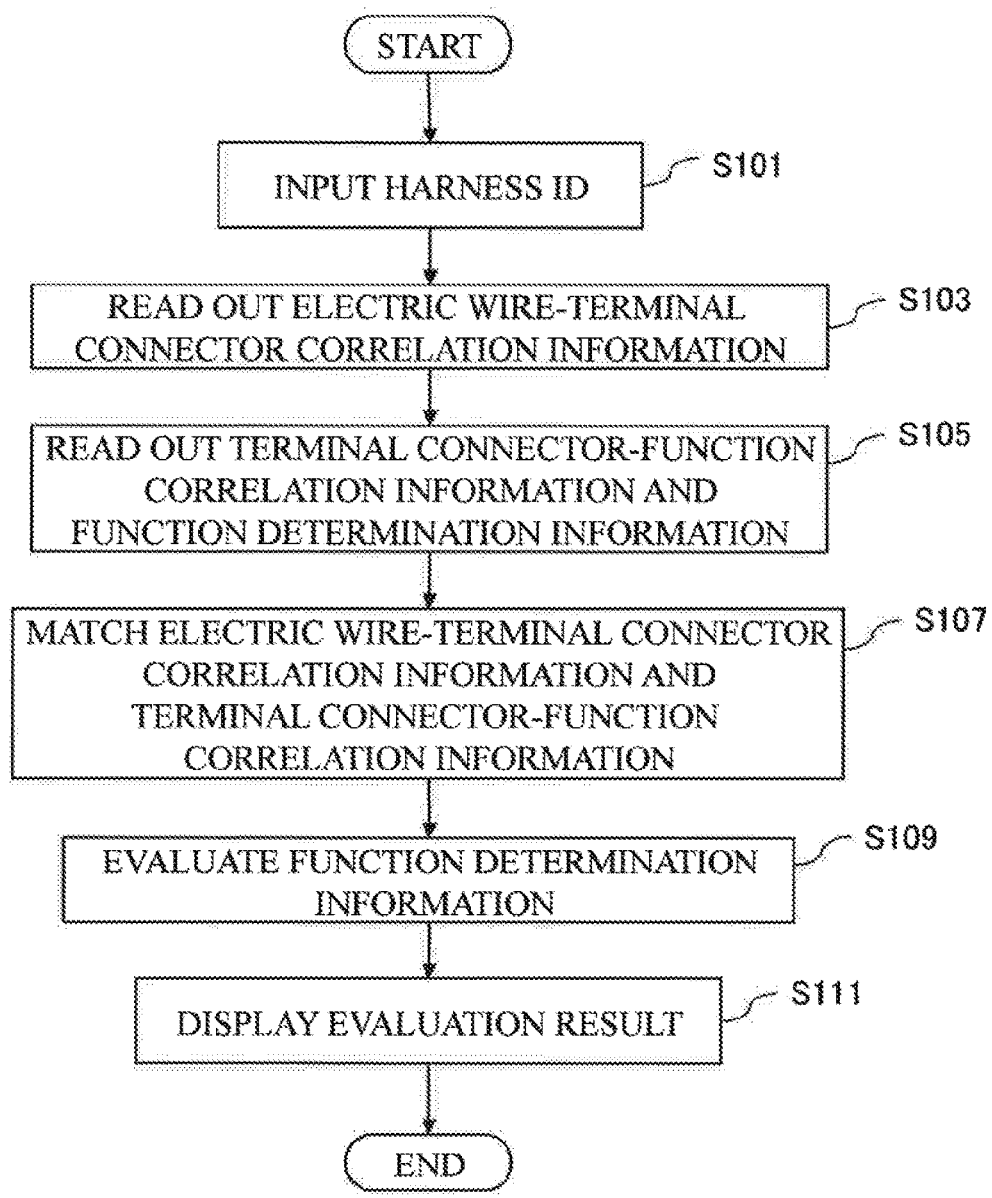
FIG. 4 is a flowchart illustrating a procedure in first evaluation.

In the first evaluation, processing is started by inputting identification information of a harness (referred to as a harness ID below), the safety of which is to be evaluated, from the input unit 1 (FIG. 4, S101). The harness ID is information given for identifying each harness. Here, it is assumed that a harness ID of "123-A" is input. The input harness ID is transmitted to the processing unit 2.

When acquiring the harness ID, the processing unit 2 reads out electric wire-terminal connector correlation information corresponding to the harness ID (123-A) from the second database 4 (FIG. 4, S103, FIG. 5). The processing unit 2 also reads out the terminal connector-function correlation information and the function determination information from the first database 3 (FIG. 4, S105, FIGS. 6 and 7).

After reading out the above information, the processing unit 2 matches the electric wire-terminal connector correlation information and the terminal connector-function correlation information by using connectors located at terminals as a key, and thereby generates information (electric wire-function correlation information) obtained by adding function information to the electric wire-terminal connector correlation information (FIG. 4, S107, FIGS. 8 and 9).

Subsequently, the processing unit 2 determines whether or not a combination of a plurality of functions included in the function determination information is included in the generated electric wire-function correlation information (FIG. 4, S109, FIGS. 8 and 9).

Figure 10A:
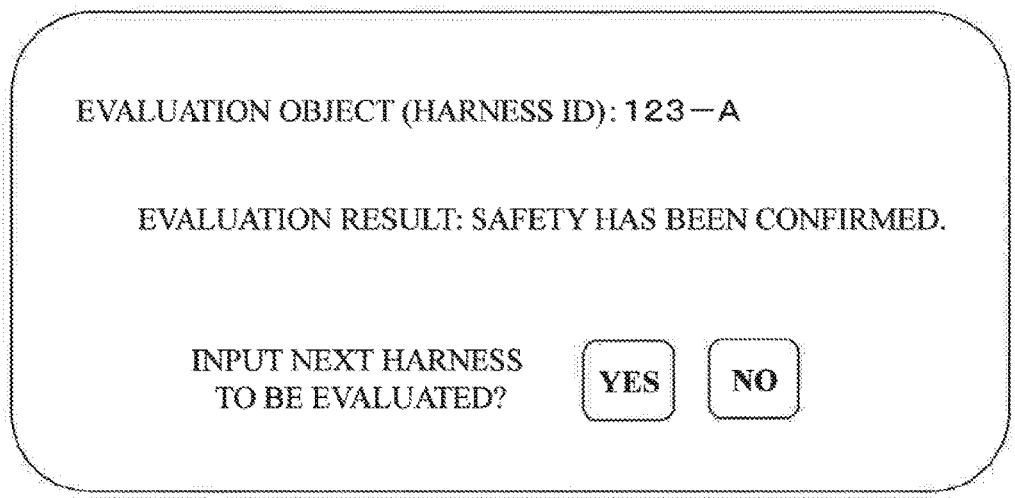
FIGS. 10A and 10B show one example of an evaluation result in the first evaluation.
Figure 10B:
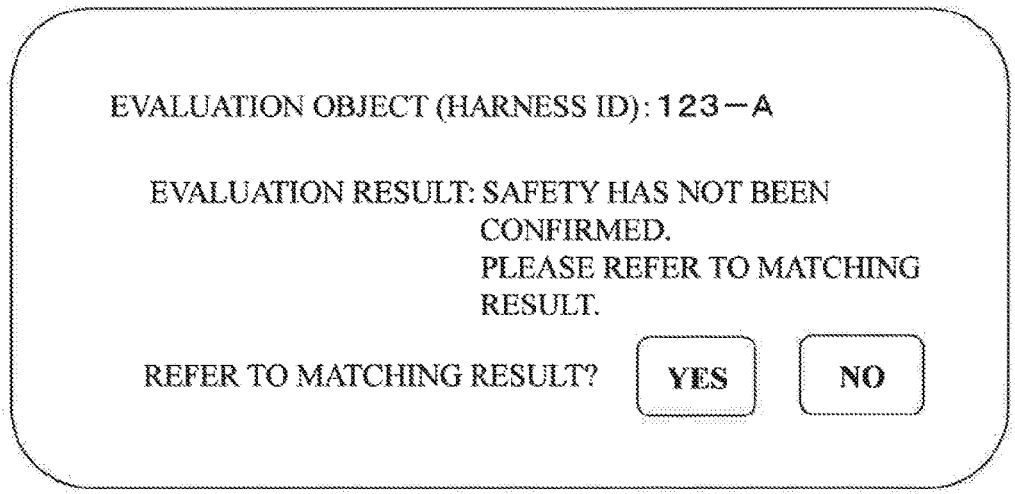

Lastly, the processing unit 2 commands the display unit 5 to display the evaluation result thereon (FIG. 4, S111, FIGS. 10A and 10B).

In the following, the specific contents of step S103 and subsequent steps are respectively described.

[Reading Out of the Electric Wire-Terminal Connector Correlation Information (FIG. 4, S103, FIG. 5)]

The electric wire-terminal connector correlation information read out from the second database 4 in executing the first evaluation is information in which electric wires belonging to each harness, connectors directly connected to both ends of each electric wire, and connectors to which each electric wire is finally connected via other electric wires and connectors are correlated with each other. FIG. 5 shows one example thereof, which is electric wire-terminal connector correlation information regarding the harness given the harness ID of "123-A."

In the example in FIG. 5, 100 electric wires (see the box of "No." in FIG. 5) belong to the harness identified as "123-A." As for an electric wire given a WIRE ID of "1-A-001" for identifying the electric wires, a pair of connectors directly connected to both ends of the electric wire are respectively given connector IDs of "P-1001" and "N-1001." A pair of connectors located at terminals corresponding to the electric wire with the WIRE ID of "1-A-001" are respectively given connector IDs (E-connector IDs) of "O-1001" and "Q-1001."

[Reading Out of the Terminal Connector-Function Correlation Information and the Function Determination Information (FIG. 4, S105, FIGS. 6 and 7)]

As shown in FIG. 6, the terminal connector-function correlation information read out from the first database 3 in executing the first evaluation is information in which connectors located at terminals and a function ID as information for identifying a function of a device to which the connectors are connected are correlated with each other.

FIG. 6 shows that, for example, a function ID corresponding to the pair of connectors identified as "O-1001" and "Q-1001" located at terminals is "Func-A1," and a function ID corresponding to a pair of connectors identified as "O-2001" and "Q-2001" is "Func-B2." The function ID of "Func-A1" identifies, for example, a function to perform the operation of an aileron as a flight control surface of an aircraft. The function ID of "Func-B2" identifies, for example, a function to perform the operation of a video playback device in a cabin of an aircraft. The function ID for identifying a particular function as described above is stored in correlation with all combinations of the pairs of connectors located at terminals.

The function determination information as another information read out from the first database 3 in executing the first evaluation is information in which all the combinations of the causes resulting in the Catastrophic Failure are described as shown in FIG. 7.

In FIG. 7, "Func-A1" identifies the function to perform the operation of an aileron as described above, and "Func-C1" identifies a function to perform the operation of an elevator as a flight control surface of an aircraft. Loss of "Func-A1" and "Func-C1" at the same time is listed up in the function determination information as a cause resulting in the Catastrophic Failure. The same applies to a combination of "Func-A2" and "Func-C2," a combination of "Func-Y1" and "Func-Z1" or the like listed up in FIG. 7. Although the function determination information involves the combination of the causes resulting in the Catastrophic Failure, the function determination information may also involve a combination of causes resulting in the Hazardous Failure.

[Matching of the Electric Wire-Terminal Connector Correlation Information and the Terminal Connector-Function Correlation Information (FIG. 4, S107, FIGS. 8 and 9)]

After reading out the electric wire-terminal connector correlation information and the terminal connector-function correlation information, the processing unit 2 matches the electric wire-terminal connector correlation information and the terminal connector-function correlation information by using the connectors (E-connector IDs) located at terminals as a key.

For example, in the case of the electric wire-terminal connector correlation information in FIG. 5 and the terminal connector-function correlation information in FIG. 6, the function ID corresponding to the E-connector IDs of "O-1001" and "Q-1001" included in the electric wire-terminal connector correlation information is "Func-A1" by reference to FIG. 6. Thus, as a matching result, the function ID of "Func-A1" is described in correlation with the terminal connectors with the E-connector IDs of "O-1001" and "Q-1001." The same applies to other E-connector IDs. As a result, the electric wire-function ID correlation information shown in FIGS. 8 and 9 are generated.

[Safety Evaluation (FIG. 4, S109, FIGS. 8 and 9)]

The processing unit 2 evaluates the safety by checking whether or not one falling under the combinations of the function IDs included in the function determination information exists in the plurality of function IDs included in the generated electric wire-function correlation information.

In an example in FIG. 8, the combinations of the function IDs ("Func-A1" and "Func-C1" to "Func-Y3" and "Func-Z3") included in the function determination information do not exist in the function IDs corresponding to the electric wires belonging to the harness identified as "123-A." Thus, an evaluation result that the harness has safety is obtained.

In an example shown in FIG. 9, the combination of the function IDs ("Func-Y3" and "Func-Z3") included in the function determination information exists in the function IDs corresponding to the electric wires belonging to the harness identified as "123-A." Thus, an evaluation result that the harness does not have safety is obtained.

[Display of the Evaluation Results (FIG. 4, S111, FIGS. 10A and 10B)]

The processing unit 2 displays the evaluation results as shown in FIGS. 10A and 10B.

When the safety has been confirmed, the result is displayed together with the evaluated harness ID as shown in FIG. 10A. Input of a next harness to be evaluated is also encouraged on the display.

When the safety has not been confirmed, the result is displayed together with the evaluated harness ID as shown in FIG. 10B. Reference to the matching result as a basis of the evaluation result is also encouraged on the display. An evaluator (a designer) uses the matching result for design change.

[Operations and Effects of the First Evaluation]

As described above, according to the first evaluation, while the combinations of the causes (the function IDs) resulting in the Catastrophic Failure are stored as the function determination information, the function IDs corresponding to the terminal connectors to which the respective electric wires belonging to the harness are connected are linked together. It is checked whether or not the combinations of the function IDs stored in the function determination information exist in the linked function IDs. The safety of wiring in the harness can be thereby confirmed. By performing the evaluation on all harnesses included in a system to be analyzed, the safety of wiring in the system can be confirmed.

Although the evaluation results are displayed in the above example, the electric wire-function correlation information may be also displayed when the electric wire-function correlation information is generated by the processing unit 2. A person may also confirm the safety by referring to the displayed electric wire-function correlation information and the function determination information.

[Second Evaluation]

In the following, the second evaluation is described by reference to FIGS. 11 to 14.

First, the outline of a processing procedure in the second evaluation is described by reference to FIG. 11. Since input of a harness ID (S201) and reading out of electric wire-terminal connector correlation information (S203) in FIG. 11 respectively have the same contents as the input of the harness ID (FIG. 4, S101) and the reading out of the electric wire-terminal connector correlation information (FIG. 4, S103) in the first evaluation, differences from the first evaluation are described below.

The processing unit 2 reads out the electric wire-terminal connector correlation information, and also reads out terminal connector-separation requirement ID correlation information from the first database 3 (FIG. 11, S205, FIGS. 5 and 12).

After reading out the electric wire-terminal connector correlation information and the terminal connector-separation requirement ID correlation information, the processing unit 2 matches the electric wire-terminal connector correlation information and the terminal connector-separation requirement ID correlation information by using terminal connector IDs as a key, and thereby generates information (electric wire-separation requirement ID correlation information) obtained by adding a separation requirement ID to the electric wire-terminal connector correlation information (FIG. 11, S207, FIGS. 13 and 14).

Subsequently, the processing unit 2 evaluates whether or not the combinations of the functions identified in the function determination information exist in the electric wire-separation requirement ID correlation information by matching the generated electric wire-separation requirement ID correlation information and the function determination information (FIG. 11, S209, FIGS. 13 and 14).

Lastly, the processing unit 2 commands the display unit 5 to display the evaluation result thereon (FIG. 11, S211).

In the following, the specific contents of step S205 and subsequent steps are respectively described.

[Reading Out of the Terminal Connector-Separation Requirement ID Correlation Information (FIG. 11, S205, FIG. 12)]

The terminal connector-separation requirement ID correlation information read out from the first database 3 in executing the second evaluation is information in which the E-connector IDs and separation requirement IDs are correlated with each other. FIG. 12 shows one example thereof.

FIG. 12 shows that, for example, a separation requirement ID corresponding to the E-connector IDs identified as O-1001 and Q-1001 is "B-001A" or "B-001B," and a separation requirement ID corresponding to the E-connector IDs identified as O-2001 and Q-2001 is "C-001A" or "C-001B."

The separation requirement ID is identification information given for determining that the redundant system is ensured. By using the wiring structure shown in FIGS. 2A and 2B as an example, the electric wires W1, W2, and W3 are required to be separately wired without belonging to the same harness. Thus, as described by reference to FIG. 1, different separation requirement IDs are respectively given to the electric wires W1, W2, and W3. It is assumed that a separation ID of A-001A is given to the electric wire W1, a separation ID of A-001B is given to the electric wire W2, and a separation ID of A-001C is given to the electric wire W3. In this case, for example, when five electric wires given A-001A and five electric wires given A-001B belong to the same harness, the separation requirement is not satisfied.

[Matching of the Electric Wire-Terminal Connector Correlation Information and the Terminal Connector-Separation Requirement ID Correlation Information (FIG. 11, S207, FIGS. 13 and 14)]

After reading out the electric wire-terminal connector correlation information and the terminal connector-separation requirement ID correlation information, the processing unit 2 matches the electric wire-terminal connector correlation information and the terminal connector-separation requirement ID correlation information by using the connectors located at terminals as a key.

For example, in the case of the electric wire-terminal connector correlation information in FIG. 5 and the terminal connector-separation requirement ID correlation information in FIG. 12, the separation requirement ID corresponding to the E-connector IDs of "O-1001" and "Q-1001" included in the electric wire-terminal connector correlation information is "B-001A" or "B-001B." Thus, as a matching result, the separation requirement ID of "B-001A" or "B-001B" is described in correlation with the WIRE ID of "1-A-001." The same applies to other E-connector IDs. As a result, the electric wire-separation requirement ID correlation information shown in FIGS. 13 and 14 is generated.

[Safety Evaluation (FIG. 11, S209, FIGS. 13 and 14)]

The processing unit 2 evaluates the safety by checking whether or not the separation requirement IDs included in the generated electric wire-separation requirement ID correlation information are identical within a range in which the redundancy is required.

In an example shown in FIG. 13, all the electric wires belonging to the harness identified as "123-A" have the same separation requirement ID within a range in which the redundancy is required. That is, a range surrounded by a dotted line in the box of the separation requirement ID indicates the range in which the redundancy is required. For example, as for electric wires identified as 1-A-001 to 1-A-005, three redundancies are achieved because of the existence of electric wires identified as 2-A-001 to 2-A-005, and electric wires identified as 3-A-001 to 3-A-005 as described above. In FIG. 13, the separation requirement IDs corresponding to 1-A-001 to 1-A-005 are all B-001A. It is thus confirmed that the electric wires are separated according to the requirement. Other electric wires where the redundancy is required also have the same separation requirement ID within the range in which the redundancy is required. Thus, an evaluation result that the harness has safety is obtained since the electric wires are separated according to the requirement.

Meanwhile, in an example shown in FIG. 14, different separation requirement IDs exist within the range in which the redundancy is required. For example, as for the electric wires identified as 1-A-001 to 1-A-005, the separation requirement IDs of B-001A and B-001B exist. Thus, an evaluation result that the harness does not have safety is obtained since the electric wires are not separated according to the requirement. The same applies to the electric wires identified as 1-B-001 to 1-B-005, electric wires identified as 1-K-001 to 1-K-005, and electric wires identified as 1-L-001 to 1-L-005.

[Display of the Evaluation Results (FIG. 11, S211)]

The processing unit 2 displays the evaluation results similarly to the first evaluation (FIGS. 10A and 10B).

[Operations and Effects of the Second Evaluation]

As described above, according to the second evaluation, while the terminal connectors and the separation requirement codes (IDs) are stored in correlation, the separation requirement codes (IDs) corresponding to the terminal connectors to which the respective electric wires belonging to the harness are connected are linked together. It is thereby checked whether or not the harness satisfies the separation requirement. Accordingly, the safety of wiring can be evaluated.

Although the present invention has been described above based on the present embodiment, the constitutions described in the aforementioned embodiment may also be freely selected or changed into other constitutions without departing from the gist of the present invention.

For example, the wiring structure used for explaining the embodiment is merely one example, and it goes without saying that the present invention may be applied to another wiring structure.

The wiring structure may also be applied to any device and component. The present invention may be applied to various devices and components where a terminal device and a relay device are connected by a cable.

What is claimed is:

1. A safety analysis method for wiring in a wiring structure in which each of a plurality of electric wires belonging to a wire harness is connected to a pair of connectors located at terminals via a relay element, the safety analysis method comprising:
    storing:
        electric wire-terminal connector correlation information in which each of the plurality of electric wires and the pair of connectors are correlated with each other, terminal connector-function correlation information in which the pair of connectors located at the terminals and a function of a device to which the connectors are connected are correlated with each other, and
        function determination information including a combination of a plurality of functions that are not allowed to be lost at the same time;
    matching the electric wire-terminal connector correlation information and the terminal connector-function correlation information when the wire harness is identified;
    generating electric wire-function correlation information in which each of the plurality of electric wires and the function of the device are correlated with each other;
    determining whether or not the combination of the plurality of functions included in the function determination information exists in the generated electric wire-function correlation information; and
    evaluating that the wire harness is safe when the combination does not exist.

2. The safety analysis method for wiring according to claim 1, further comprising displaying the generated electric wire-function correlation information.

3. The safety analysis method for wiring according to claim 1, further comprising displaying a result of the evaluating.

4. The safety analysis method for wiring according to claim 1, further comprising:
    storing terminal connector-separation requirement correlation information in which the pair of connectors located at the terminals and a separation requirement code are correlated with each other;
    matching the electric wire-terminal connector correlation information and the terminal connector-separation requirement correlation information when the wire harness is identified; and
    generating electric wire-separation requirement correlation information in which each of the plurality of electric wires and the separation requirement code are correlated with each other.

5. The safety analysis method for wiring according to claim 4, further comprising:
    determining whether or not the separation requirement codes included in the generated electric wire-separation requirement correlation information are identical within a range in which redundancy is required; and
    evaluating that the wire harness is safe when the separation requirement codes are identical.

6. The safety analysis method for wiring according to claim 4, further comprising displaying the evaluation result.

7. The safety analysis method for wiring according to claim 1, further comprising:
    changing a design of the wiring structure based on the evaluation of the wire harness, such that an evaluation result of the changed design indicates that the wire harness is safe.

8. A safety analysis method for wiring in a wiring structure in which each of a plurality of electric wires belonging to a wire harness is connected to a pair of connectors located at terminals via a relay element, the safety analysis method comprising:
    storing electric wire-terminal connector correlation information in which each of the plurality of electric wires and the pair of connectors are correlated with each other, and terminal connector-separation requirement correlation information in which the pair of connectors located at the terminals and a separation requirement code are correlated with each other;
    matching the electric wire-terminal connector correlation information and the terminal connector-separation requirement correlation information when the wire harness is identified;
    generating electric wire-separation requirement correlation information in which each of the plurality of electric wires and the separation requirement code are correlated with each other;
    determining whether or not the separation requirement codes included in the generated electric wire-separation requirement correlation information are identical; and
    evaluating that the wire harness is safe when the separation requirement codes are identical.

9. The safety analysis method for wiring according to claim 8, further comprising displaying the evaluation result.

10. The safety analysis method for wiring according to claim 8, further comprising:
    changing a design of the wiring structure based on the evaluation of the wire harness, such that an evaluation result of the changed design indicates that the wire harness is safe.

* * * * *

UNITED STATES PATENT AND TRADEMARK OFFICE
CERTIFICATE OF CORRECTION

PATENT NO.        : 10,319,057 B2
APPLICATION NO.   : 15/800795
DATED             : June 11, 2019
INVENTOR(S)       : Koji Toyama et al.

It is certified that error appears in the above-identified patent and that said Letters Patent is hereby corrected as shown below:

In the Specification

Column 4, Line 17, "A-00A," should be -- A-001A, --.

Signed and Sealed this
Twenty-fourth Day of September, 2019

Andrei Iancu
*Director of the United States Patent and Trademark Office*